US012760750B2

(12) United States Patent
Mornacchi et al.

(10) Patent No.: US 12,760,750 B2
(45) Date of Patent: Oct. 13, 2026

(54) HYDRAULIC ACTUATOR SYNCHRONIZATION SYSTEM

(71) Applicant: Microtecnica S.r.l., Turin (IT)

(72) Inventors: Andrea Mornacchi, Turin (IT); Gaetano Quattrocchi, Portopalo di capo passero (IT); Dario Savino, Palazzolo Vercellese (IT)

(73) Assignee: Microtecnica S.r.l., Turin (IT)

( * ) Notice: Subject to any disclaimer, the term of this patent is extended or adjusted under 35 U.S.C. 154(b) by 0 days.

(21) Appl. No.: 19/207,853

(22) Filed: May 14, 2025

(65) Prior Publication Data

US 2025/0361884 A1 Nov. 27, 2025

(30) Foreign Application Priority Data

May 23, 2024 (EP) .................................... 24177790

(51) Int. Cl.
*F15B 11/22* (2006.01)

(52) U.S. Cl.
CPC ......... *F15B 11/22* (2013.01); *F15B 2211/428* (2013.01)

(58) Field of Classification Search
CPC ........ F15B 2211/428; F15B 9/10; F15B 11/22
See application file for complete search history.

(56) References Cited

U.S. PATENT DOCUMENTS

| | | | | |
|---|---|---|---|---|
| 3,756,123 | A | 9/1973 | Howarth et al. | |
| 6,076,767 | A * | 6/2000 | Farley | B64C 13/38 244/78.1 |
| 6,837,054 | B2 | 1/2005 | Brocard et al. | |
| 7,513,101 | B2 | 4/2009 | Eschborn et al. | |
| 9,507,350 | B2 | 11/2016 | Alstrin et al. | |
| 10,704,497 | B2 * | 7/2020 | Kopecek | F02K 1/72 |
| 10,773,795 | B2 | 9/2020 | Good | |
| 11,022,154 | B2 | 6/2021 | Kracke | |
| 11,242,131 | B2 | 2/2022 | Tzabari | |
| 11,603,185 | B2 | 3/2023 | Polcuch et al. | |
| 2003/0136129 | A1 * | 7/2003 | Brocard | F15B 9/16 60/771 |
| 2019/0055965 | A1 | 2/2019 | Kracke | |

OTHER PUBLICATIONS

European Search Report for Application No. 24177790.3, mailed Nov. 4, 2024, 8 pages.

* cited by examiner

*Primary Examiner* — Abiy Teka
(74) *Attorney, Agent, or Firm* — Kilpatrick Townsend & Stockton, LLP

(57) ABSTRACT

A hydraulic actuator synchronization system. The hydraulic actuator synchronization system includes a leader actuator including a leader actuating member and a follower actuator including a follower actuating member. Both the leader actuator and the follower actuator are connected to a differential controller such that a resultant displacement of the differential controller is representative of a difference between the movement of the leader actuating member and the movement of the follower actuating member. The differential controller is connected to a valve in fluid communication with the follower actuator such that the resultant displacement of the differential controller controls a flow of hydraulic fluid through the valve such that the movement of the follower actuating member is adjusted based on the movement of the leader actuating member.

19 Claims, 3 Drawing Sheets

HYDRAULIC ACTUATOR SYNCHRONIZATION SYSTEM

CROSS-REFERENCE TO RELATED APPLICATIONS

This application claims the benefit of European Patent Application No. 24177790.3 filed May 23, 2024, the disclosure of which is incorporated herein by reference in its entirety.

TECHNICAL FIELD

This disclosure relates to a hydraulic actuator synchronization system. In particular, this disclosure relates to a system and method for adjusting the movement of a follower actuating member via the displacement of a differential controller connected between a leader actuator and a follower actuator.

BACKGROUND

In aircraft, the use of multiple actuators to act together on a single flight surface helps to mitigate the risk of disconnection and increases the safety of the system. It is useful to synchronise the movement of the actuators to prevent deformation of the surface. When the actuators are acting upon an inherently unbalanced surface, a large and heavy mechanical load sharing solution may be required.

The present disclosure aims to provide an improved hydraulic actuator synchronization system.

SUMMARY

When viewed from a first aspect, the invention provides a hydraulic actuator synchronization system comprising: a leader actuator comprising a leader actuating member; a follower actuator comprising a follower actuating member; a differential controller; and a valve for controlling a flow of hydraulic fluid to the follower actuator; wherein the leader actuator is connected to the differential controller such that the differential controller is displaced by a distance representative of a movement of the leader actuating member; wherein the follower actuator is connected to the differential controller such that the differential controller is displaced by a distance representative of the movement of the follower actuating member; wherein a resultant displacement of the differential controller is representative of a difference between the movement of the leader actuating member and the movement of the follower actuating member; wherein the valve is in fluid communication with the follower actuator such that the flow of hydraulic fluid through the valve adjusts the movement of the follower actuating member; and wherein the differential controller is connected to the valve such that the resultant displacement of the differential controller controls the flow of hydraulic fluid through the valve such that the movement of the follower actuating member is adjusted based on the movement of the leader actuating member.

When viewed from a second aspect, the invention provides a method of synchronising a leader actuator and a follower actuator; wherein the leader actuator comprises a leader actuating member and the follower actuator comprises a follower actuating member; the method comprising: moving the leader actuating member; displacing a differential controller by a distance representative of the movement of the leader actuating member; displacing the differential controller by a distance representative of a movement of the follower actuating member; wherein a resultant displacement of the differential controller is representative of a difference between the movement of the leader actuating member and the movement of the follower actuating member; wherein a valve is in fluid communication with the follower actuator such that a flow of hydraulic fluid through the valve adjusts the movement of the follower actuating member; and using the resultant displacement of the differential controller to control the flow of hydraulic fluid through the valve such that the movement of the follower actuating member is adjusted based on the movement of the leader actuating member.

In some examples, the system comprises a mechanical connection between the leader actuator and the differential controller. The mechanical connection may be arranged to transmit the movement of the leader actuating member to the differential controller. The system may comprise a mechanical connection between the follower actuator and the differential controller. The mechanical connection may be arranged to transmit the movement of the follower actuating member to the differential controller. A mechanical connection may help to improve the safety of the system and may help to reduce the time delay of the feedback signal when compared to an electrical connection.

In some examples, the differential controller comprises two opposite threaded screws. In some examples, the mechanical connection between the leader actuator and the differential controller is arranged to wind or unwind one of the two opposite threaded screws of the differential controller in response to the movement of the leader actuating member. In some examples, the mechanical connection between the follower actuator and the differential controller is arranged to wind or unwind one of the two opposite threaded screws of the differential controller in response to the movement of the follower actuating member.

In some examples, the first opposite threaded screw of the two opposite threaded screws is wound at a first rate and the second opposite threaded screw of the two opposite threaded screws is wound at a second rate. In some examples, the two opposite threaded screws are arranged to displace the differential controller when the first rate is different to the second rate by the resultant displacement of the differential controller.

In some examples, the resultant displacement of the differential controller is therefore representative of a difference between the first rate and the second rate. The difference between the first rate and the second rate may be representative of the difference between the (e.g. rate of) movement of the leader actuating member and the movement of the follower actuating member.

In some examples, the resultant displacement of the differential controller is representative of the difference between the movement of the leader actuating member and the movement of the follower actuating member, as well as being representative of the difference between the first rate and the second rate.

The resultant displacement of the differential controller controls the flow of hydraulic fluid through the valve, which in turn adjusts the movement of the follower (and, e.g., leader) actuating member(s). Thus, the movement of the follower (and, e.g., leader) actuating member(s) may be controlled based on the difference between the (e.g. rate of) movement of the leader and follower actuating members.

In some examples, the flow of hydraulic fluid through the valve is arranged to synchronise the movement of the follower actuating member with the leader actuating member. Thus, the valve may, in response to the resultant displacement of the differential controller, be arranged to increase the flow of hydraulic fluid to the follower actuating member, when the (e.g. rate of) movement of the leader actuating member is greater than the (e.g. rate of) movement of the follower actuating member.

Similarly, the valve may, in response to the resultant displacement of the differential controller, be arranged to decrease the flow of hydraulic fluid to the follower actuating member, when the (e.g. rate of) movement of the leader actuating member is less than the (e.g. rate of) movement of the follower actuating member. Thus, the valve may comprise a balancing valve.

In some examples, the leader actuator comprises a leader motion conversion device. The follower actuator may comprise a follower motion conversion device. The leader motion conversion device may be arranged to convert the movement of the leader actuating member into an input for the differential controller. The follower motion conversion device may be arranged to convert the movement of the follower actuating member into an input for the differential controller. In some examples, either of the motion conversion devices comprises a gearbox and one of a rollerscrew, a ballscrew or an acme screw.

The actuators may comprise any suitable actuator. In some examples, the actuators comprise rotary actuators. In some examples, the actuators comprise linear actuators.

In some examples, where the actuators are linear actuators, the motion conversion device comprises a linear to rotary conversion device and is arranged to convert the linear movement of the respective actuating member into rotary movement, e.g. about a screw of the differential controller. In some examples, where the actuators are rotary actuators, the motion conversion device comprises a rotary to rotary conversion device and is arranged to convert the rotary movement of the respective actuating member into rotary movement, e.g. about a screw of the differential controller.

In some examples, the leader actuator and/or the follower actuator is connected to the differential controller such that no load is carried by the connection. Each actuator may be connected to the differential controller by any suitable means. In some examples, the connection between the leader actuator and the differential controller and/or the connection between the follower actuator and the differential controller comprises a shaft, wherein the shaft is arranged to carry no load. In some examples, the shaft comprises a rigid shaft. In some examples, the shaft comprises a flexible shaft. The use of a flexible shaft may help to allow the system to be more compactly arranged and subsequently lighter.

In some examples, the leader actuator and/or the follower actuator comprises a linear variable differential transformer (LVDT) or a rotary variable differential transformer (RVDT). The LVDT or the RVDT may be used as status monitors and/or to detect anomalies in the system and/or to provide closed-loop feedback control.

In some examples, the valve comprises a valve spool and the differential controller is arranged to displace the valve spool by a distance representative of the resultant displacement of the differential controller to control the flow of hydraulic fluid through the valve.

In some examples, the system comprises a hydraulic fluid supply in fluid communication with the valve (and thus with the leader actuator and the follower actuator). In some examples, the system comprises more than one hydraulic fluid supply each in fluid communication with the valve. The use of multiple hydraulic fluid supplies may help to improve the redundancy of the system.

In some examples, the system comprises: a plurality of follower actuators each comprising a follower actuating member; a plurality of differential controllers; and a plurality of valves; wherein each of the plurality of valves is in fluid communication with a corresponding follower actuator of the plurality of follower actuators; wherein the leader actuator is connected to each of the plurality of differential controllers such that each of the differential controllers is displaced by a distance representative of a movement of the leader actuating member; wherein each of the plurality of follower actuators is connected to a corresponding differential controller of the plurality of differential controllers such that the corresponding differential controller is displaced by a distance representative of a movement of the follower actuating member; wherein a resultant displacement of each of the plurality of differential controllers is representative of a difference between the movement of the leader actuating member and the movement of the corresponding follower actuating member; wherein each of the plurality of valves controls a flow of hydraulic fluid to their corresponding follower actuator such that the flow of hydraulic fluid through the valve adjusts the movement of a corresponding follower actuating member; and wherein each of the plurality of differential controllers is connected to a corresponding valve of the plurality of valves such that the resultant displacement of the differential controller controls the flow of hydraulic fluid through the corresponding valve such that the movement of the corresponding follower actuating member is adjusted based on the movement of the leader actuating member.

In some examples, the follower actuators, differential controllers and valves are connected together such that each of the plurality of follower actuators is paired with a corresponding differential controller and corresponding valve. In this way, each follower actuator and corresponding differential controller and corresponding valve form a separate feedback loop with the leader actuator such that, for N follower actuators, there are N differential controllers and N valves.

BRIEF DESCRIPTION OF DRAWINGS

Certain examples of the present disclosure will now be described, by way of example only, with reference to the accompanying drawings in which.

DETAILED DESCRIPTION

Figure 1:
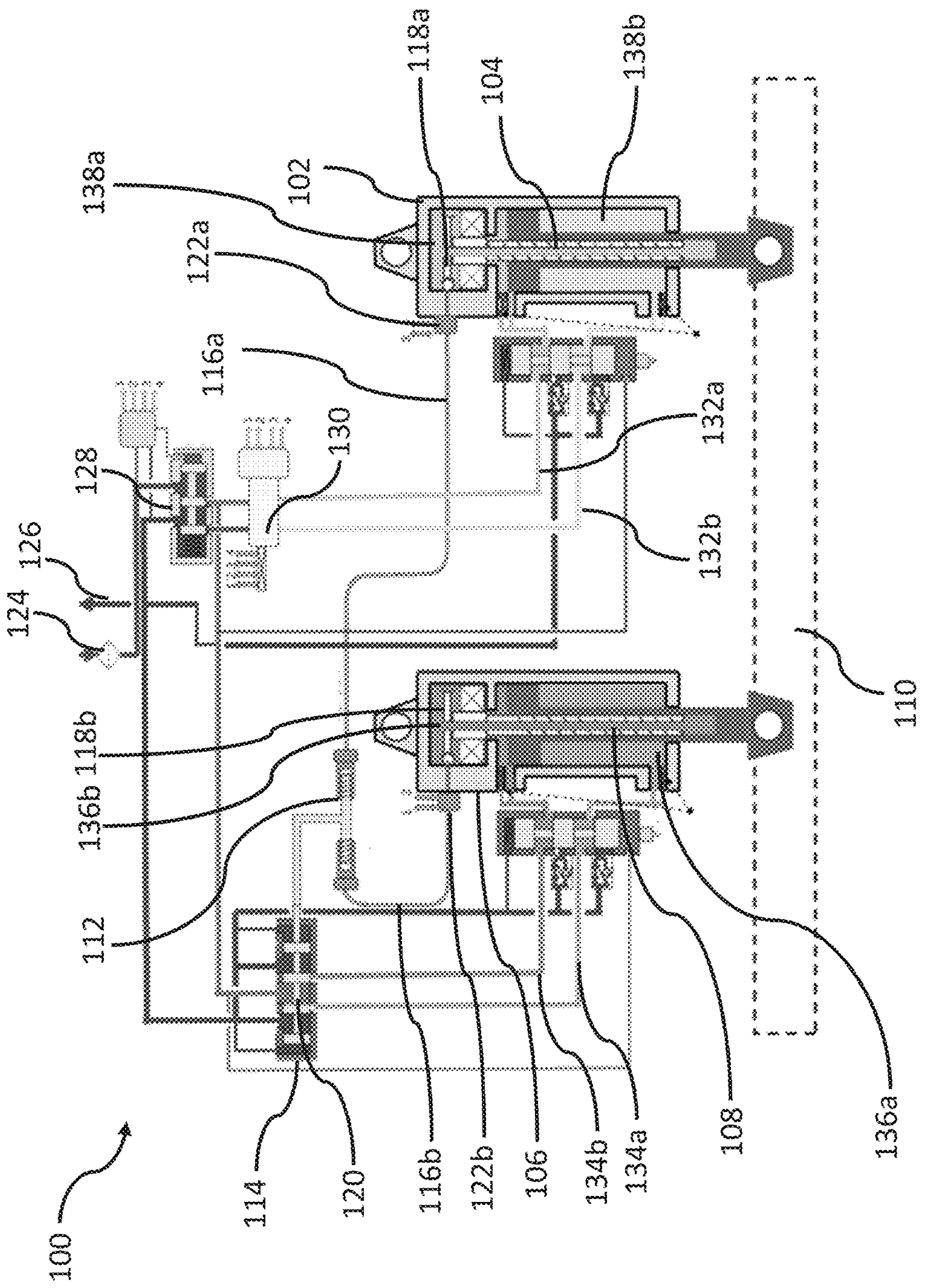
FIG. 1 is a schematic view of a hydraulic actuator synchronization system.

FIG. 1 shows a schematic view of a hydraulic actuator synchronization system 100.

In this example, the hydraulic actuator synchronization system 100 comprises a leader actuator 102 and a follower actuator 106. The leader actuator 102 acts upon a flight surface 110 through the movement of a leader actuating member 104 and the follower actuator 106 acts upon the flight surface 110 through the movement of a follower actuating member 108.

The leader actuator 102 and the follower actuator 106 are connected to a differential controller 112 using respective flexible shafts 116*a* and 116*b*. The differential controller 112 is arranged to be displaced by (e.g. rotation of) the flexible shafts 116*a* and 116*b*.

A balancing valve 114 is in fluid communication with the follower actuator 106. The flow of hydraulic fluid through the balancing valve 114 adjusts the movement of the follower actuating member 108. The balancing valve 114 is also connected to the differential controller 112 such that the displacement of the differential controller 112 controls the flow of hydraulic fluid through the balancing valve 114. In this example, this is achieved via a displacement of a valve spool 120, which is displaced by the differential controller 112.

The hydraulic fluid is supplied from a hydraulic fluid supply 124 through a shutoff valve 128. The shutoff valve 128 is connected to a direct drive valve (DDV) 130 which controls the pressure of the hydraulic fluid flowing to the leader actuator 102. To move the flight surface 110, hydraulic fluid is supplied to the leader actuator 102 such that the leader actuating member 104 is moved. To achieve this, the DDV 130 adjusts the pressure of the hydraulic fluid flowing through flow lines 132*a*, 132*b*.

The first flow line 132*a* supplies a first region 138*a* of the leader actuating member 104 and the second flow line 132*b* supplies a second region 138*b* of the leader actuating member 104. In this example, the first region 138*a* and the second region 138*b* are arranged to be opposite each other in the leader actuator 102.

The adjusted pressure of the hydraulic fluid creates a pressure differential across the leader actuating member 104. The pressure differential causes a force to be applied to the leader actuating member 104 in the direction of the region with a lower relative pressure. The application of this force results in the leader actuating member 104 moving in the direction of the region with a lower relative pressure.

Each actuator 102, 106 comprises a motion conversion device 118*a*, 118*b*. In this example, the movement of the leader actuating member 104 is converted using the motion conversion device 118*a* into an input suitable for the differential controller 112. In this example, the motion conversion device 118*a* converts the linear motion of the leader actuating member 104 into rotary motion about the differential controller 112. Other types of conversion may be envisaged for different types of actuator.

The rotary motion is transmitted to the differential controller 112 through the flexible shaft 116*a*. The differential controller 112 has two opposite threaded screws to which the flexible shafts 116*a* and 116*b* attach. The rotary motion of the flexible shaft 116*a* causes a winding or unwinding of one of the opposite threaded screws of the differential controller 112. This results in the displacement of the differential controller 112 by a distance representative of the movement of the leader actuating member 104.

In this example, the flexible shafts 116*a*, 116*b* do not carry loads through them as they only need to transmit rotary motion about a screw of the differential controller 112. This may help the system to be more compact and, as such, lighter.

When the differential controller 112 is displaced, the flow of hydraulic fluid through the balancing valve 114 is changed to adjust the follower actuating member 108 to move in accordance with the movement of the leader actuating member 104. In this example, the displacement of the differential controller 112 causes a displacement of the valve spool 120. This valve spool 120 adjusts the size of the opening of the entrance to the flow lines 134*a*, 134*b*. In this way, the pressure of the hydraulic fluid flowing through flow lines 134*a*, 134*b* is adjusted.

The first flow line 134*a* supplies a first region 136*a* of the follower actuating member 108 and the second flow line 134*b* supplies a second region 136*b* of the follower actuating member 108. In the same way as for the movement of the leader actuating member 104, a pressure differential is created across the follower actuating member 108. This pressure differential then causes a force to be applied to the follower actuating member 108 in the direction of the region with a lower relative pressure and subsequently causes a movement of the follower actuating member 108 in that direction.

The subsequent linear motion of the movement of the follower actuating member 108 is converted using a motion conversion device 118*b* into rotary motion. This rotary motion is transmitted to the differential controller 112 through a flexible shaft 116*b*. The rotary motion of the flexible shaft 116*b* causes a winding or unwinding of the other of the two opposite threaded screws of the differential controller 112. This then causes a displacement of the differential controller 112 by a distance representative of the movement of the follower actuating member 108.

This displacement of the differential controller 112 is offset by the displacement of the differential controller 112 from the movement of the leader actuating member 104. This creates a resultant displacement of the differential controller 112.

These displacements of the differential controller 112 are also representative of the rate at which the rotary motion of the respective flexible shaft winds or unwinds the respective screw of the two opposite threaded screws of the differential controller 112. In this example, the movement of the leader actuating member 104 causes a winding of the respective connected screw at a first rate and the movement of the follower actuating member 108 causes a winding of the respective connected screw at a second rate. Therefore, the resultant displacement of the differential controller 112 is also representative of a difference between the first rate and the second rate.

When the leader actuating member 104 and the follower actuating member 108 are moving in a synchronised manner, the resultant displacement of the differential controller 112 is such that the flow of hydraulic fluid through the balancing valve 114 is unchanged. When the movement of the leader actuating member 104 is out of sync with the follower actuating member 108, the resultant displacement of the differential controller 112 is such that the flow of hydraulic fluid through the balancing valve 114 is changed to adjust the movement of the follower actuating member 108 to move in synchronisation with the movement of the leader actuating member 104.

Through providing mechanical feedback in this way, the movement of the actuating members is synchronised without a load being carried by the flexible shafts or the motion conversion devices. This helps to provide a lighter and more compact system.

Rotary variable differential transformers (RVDT) 122*a*, 122*b* are used to monitor the status of each flexible shaft 116*a*, 116*b* and to detect anomalies in the system. When a flexible shaft experiences no angular displacement, a stationary voltage is output by the corresponding RVDT. When the flexible shaft experiences an angular displacement, the corresponding RVDT outputs a voltage proportional to the angular displacement of the flexible shaft. This signal may then be used in any suitable way. For example, when the flexible shaft experiences excessive angular displacement, a controller may switch to using a different system command logic.

The RVDTs 122*a*, 122*b* may also be used to provide closed-loop feedback control by closing a position feedback loop or a velocity feedback loop. The closing of a feedback loop may also be achieved by attaching LVDTs to each of the actuating members 104, 108. Thus, in some examples each actuator may have both an RVDT and an LVDT performing different tasks (e.g. monitoring and control loop feedback).

Figure 2:
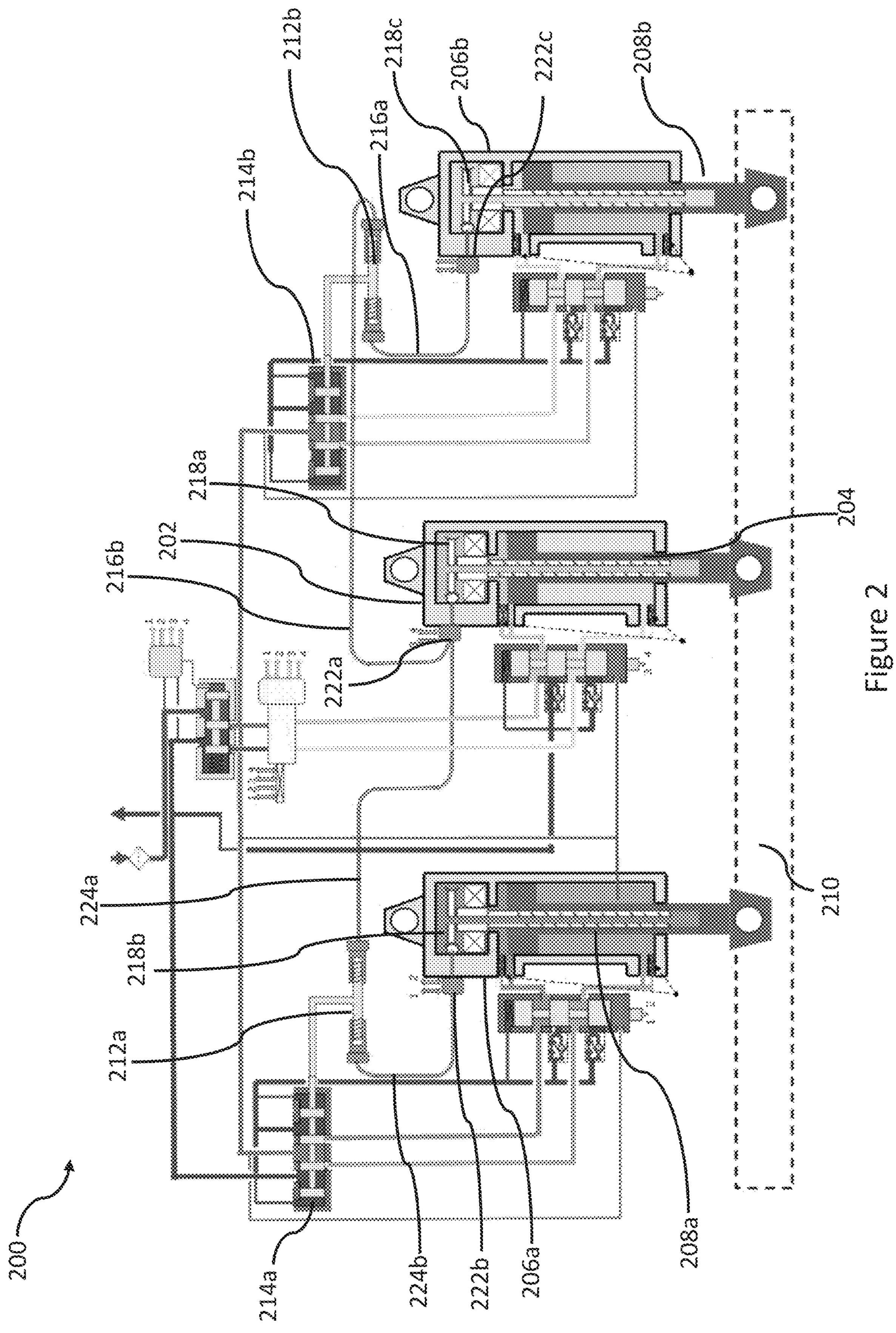
FIG. 2 is a schematic view of a hydraulic actuator synchronisation system with multiple follower actuators.

FIG. 2 shows a schematic view of a hydraulic actuator synchronisation system 200 with multiple follower actuators 206*a*, 206*b*.

In this example, the hydraulic actuator synchronization system 200 is similar to the system shown in FIG. 1 but with a second follower actuator 206*b* having a second follower actuating member 208*b* to be synchronised. The second follower actuating member 208*b* also acts upon the flight surface 210.

The movement of the follower actuating member 208*a* is synchronised with the movement of the leader actuating member 204 in the same way as in the system shown in FIG. 1. In order to synchronise the second follower actuator 206*b* with the leader actuator 202, the system shown in FIG. 1 is repeated.

The motion conversion device 218*a* converts the linear motion of the leader actuating member 204 into rotary motion about a second differential controller 212*b*. This rotary motion is transmitted to the second differential controller 212*b* through a flexible shaft 216*a*. The second differential controller 212*b* has two screw threaded sections to which flexible shafts 216*a* and 216*b* attach. The rotary motion of the flexible shaft 216*a* causes a displacement of the second differential controller 212*b* by a distance representative of the movement of the leader actuating member 204.

When the second differential controller 212*b* is displaced, the flow of hydraulic fluid through a second balancing valve 214*b* is changed to adjust the second follower actuating member 208*b* to move in accordance with the movement of the leader actuating member 204. The flow of hydraulic fluid through the second balancing valve 214*b* adjusts the movement of the second follower actuating member 208*b* through the same process as described in FIG. 1 to adjust the movement of the follower actuating member 208*a*.

The linear motion of the movement of the second follower actuating member 208*b* is converted using a motion conversion device 218*c* into rotary motion. This motion is transmitted to a second differential controller 212*b* through a flexible shaft 216*b*. The rotary motion of the flexible shaft 216*b* then causes a displacement of the second differential controller 212*b* by a distance representative of the movement of the follower actuating member 208*b*.

Once again, a resultant displacement is created of the second differential controller 212*b*. This resultant displacement is such that, when the leader actuating member 204*b* and the second follower actuating member 208*b* are moving in accordance, the flow of hydraulic fluid through the second balancing valve 214*b* is unchanged.

When the movement of the leader actuating member 204 is out of sync with the second follower actuating member 208*b*, the resultant displacement of the second differential controller 212*b* is such that the flow of hydraulic fluid through the second balancing valve 214*b* is changed to adjust the movement of the second follower actuating member 208*b* to move in accordance with the movement of the leader actuating member 204.

In this way, the system can be generalised to any number of actuators by connecting each follower actuator to a corresponding differential controller and a balancing valve, and connecting the leader actuator to every differential controller.

Figure 3:
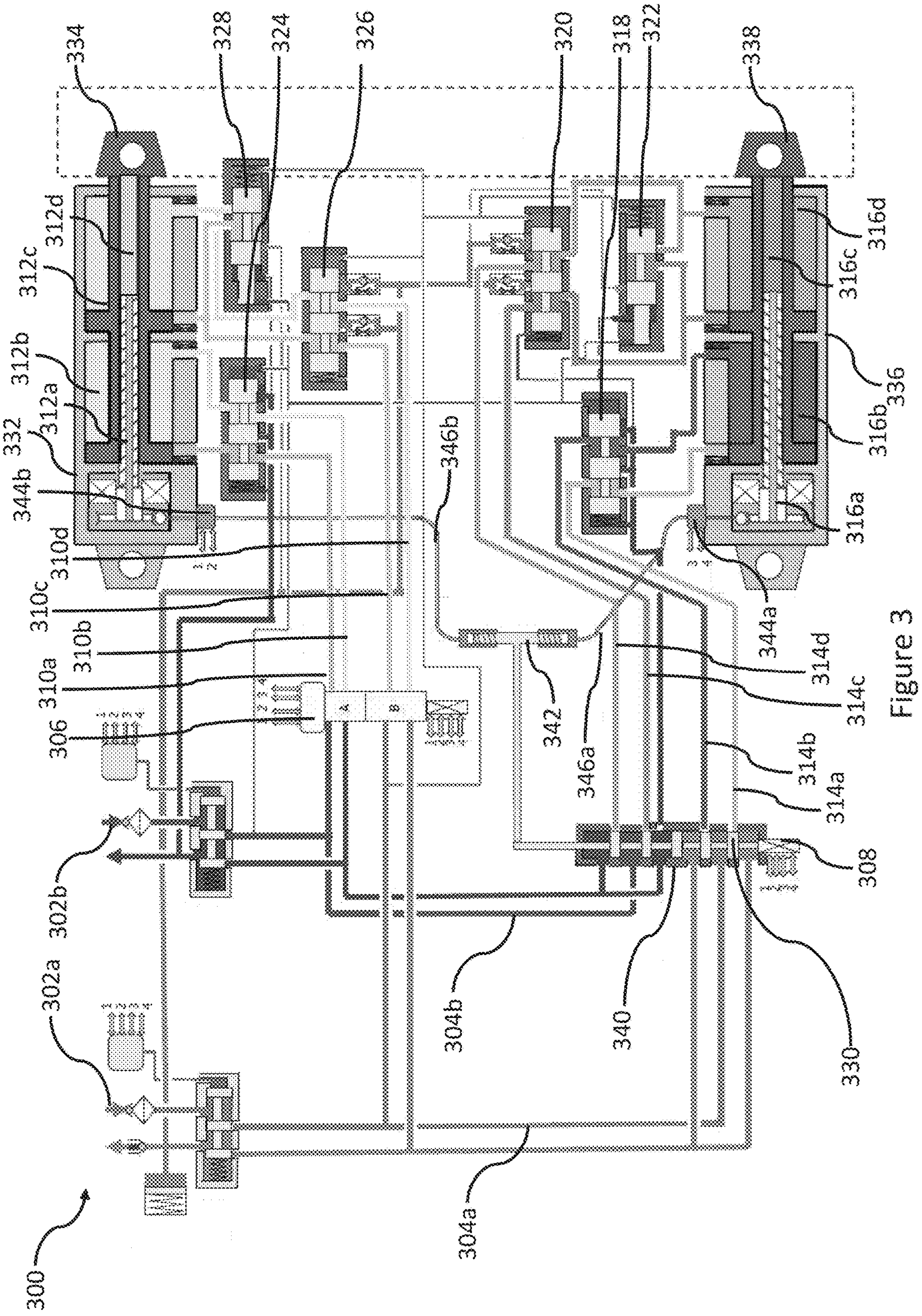
FIG. 3 is a schematic view of a dual hydraulic actuator synchronisation system.

FIG. 3 shows a schematic view of a dual hydraulic actuator synchronisation system.

Dual hydraulic systems provide multiple supplies of hydraulic fluid to the actuators for redundancy in case of failure. In this example, the operation of the hydraulic actuator synchronisation system 300 is similar to the systems shown in FIGS. 1 and 2. However, the flow of hydraulic fluid is provided by two separate hydraulic fluid supplies 302*a*, 302*b*. In this way, additional redundancy is provided to the system in the event of a supply malfunction.

Each hydraulic fluid supply 302*a*, 302*b* provides a supply line 304*a*, 304*b* to the dual DDV 306, which controls the supply of hydraulic fluid to the leader actuator 332. There are four flow lines 310*a*, 310*b*, 310*c*, 310*d* connecting the leader actuator 332 to the dual DDV 306.

The first flow line 310*a* and the second flow line 310*b* feed through a bypass valve 324 and into a first region 312*a* and a second region 312*b* of the leader actuator 332 respectively. The third flow line 310*c* and the fourth flow line 310*d* feed through a damped bypass valve 326 and a mode valve 328 into a third region 312*c* and a fourth region 312*d* of the leader actuator 332 respectively.

The bypass valve 324, damped bypass valve 326 and the mode valve 328 regulate the pressure of the flow of hydraulic fluid by either reducing or increasing the size of a respective aperture of each valve through which hydraulic fluid flows.

In order to move the leader actuating member 334, the dual DDV 306 adjusts the size of an aperture of the dual DDV 306 through which hydraulic fluid flows. By increasing the size of the aperture, the pressure of hydraulic fluid flowing through a corresponding flow line is increased. By decreasing the size of the aperture, the pressure of hydraulic fluid flowing through the corresponding flow line is decreased.

The dual DDV 306 adjusts the size of the apertures of the four flow lines 310*a*, 310*b*, 310*c*, 310*d* to cause two pressure differentials across the leader actuating member 334. The first pressure differential is between the first region 312*a* and the second region 312*b* of the leader actuator 332 and the second pressure differential is between the third region 312*c* and the fourth region 312*d* of the leader actuator 332.

The two pressure differentials cause two respective forces to act on the leader actuating member 334 in the direction of the lower relative pressure region. These forces cause a movement of the leader actuating member 334 in the direction of the lower relative pressure region.

Each hydraulic fluid supply 302*a*, 302*b* provides a different supply line 304*a*, 304*b* of hydraulic fluid to the balancing valve 340. The balancing valve 340 is in fluid communication with the follower actuator 336 in the same way as the dual DDV 306 is in fluid communication with the leader actuator 332, i.e. the balancing valve 340 is in fluid communication with the follower actuator 336 through four flow lines 314*a*, 314*b*, 314*c*, 314*d*.

The first flow line 314*a* and the second flow line 314*b* feed through a bypass valve 318 and into a first region 316*a* and a second region 316*b* of the follower actuator 336 respectively. The third flow line 316*c* and the fourth flow line 316*d* feed through a damped bypass valve 320 and a mode valve 322 into a third region 316*c* and a fourth region 316*d* of the follower actuator 336 respectively.

The bypass valve 318, damped bypass valve 320 and the mode valve 322 regulate the pressure of the flow of hydraulic fluid by either reducing or increasing the size of a respective aperture of each valve through which hydraulic fluid flows.

The movement of the follower actuating member 338 is synchronised similarly to the examples of FIGS. 1 and 2, and the follower actuating member 338 is moved using the same process as for the movement of the leader actuating member 334. A displacement of the differential controller 342 causes a subsequent displacement of the valve spool 340 of the balancing valve 340. This adjusts the size of the apertures through which hydraulic fluid flows through the balancing valve 340.

By increasing the size of an aperture, the pressure of hydraulic fluid flowing through a corresponding flow line is increased. By decreasing the size of an aperture, the pressure of hydraulic fluid flowing through a corresponding flow line is decreased. The displacement of the valve spool 330 therefore causes two pressure differentials across the follower actuating member 338.

The first pressure differential is between the first region 316*a* and the second region 316*b* and the second pressure differential is between the third region 316*c* and the fourth region 316*d*. These pressure differentials cause two forces to act on the follower actuating member 338 in the direction of the lower relative pressure region. This causes a movement of the follower actuating member 338 in the direction of the lower relative pressure region.

The differential controller 342 only needs to control the flow of hydraulic fluid through the balancing valve 340 in order to adjust the movement of the follower actuating member 338 and, as such, synchronise the leader actuator 332 and the follower actuator 336. The skilled person would be able to generalise this example to any number of redundant hydraulic systems or actuators.

In this example, a linear variable differential transformer (LVDT) 308 is used to monitor the status of the balancing valve 340 and to detect anomalies in the system. When the valve spool 330 experiences a linear displacement from a zero position, the LVDT 308 outputs a voltage proportional to the linear displacement of the valve spool 330. This signal may then be used in any suitable way. For example, when the valve spool 330 experiences a greater than expected linear displacement, a controller may switch to a different system command logic.

RVDTs 344*a*, 344*b* are used to monitor the status of each flexible shaft 346*a*, 346*b* and to detect anomalies in the system similarly to FIG. 1. Either the RVDTs or LVDTs attached to each actuating member 334, 338 may close the position/speed feedback loop if required by the system. Thus, it is possible to have both RVDTs and LVDTs on the same actuator performing different tasks (e.g. status monitoring and control loop feedback).

It will be appreciated by those skilled in the art that this disclosure has been illustrated by describing one or more specific examples thereof, but is not limited to these examples; many variations and modifications are possible, within the scope of the accompanying claims. For example, it will be appreciated that all of the features described herein relating to the system may apply equally to the method and vice versa, as appropriate.

The invention claimed is:

1. A hydraulic actuator synchronization system comprising:

a leader actuator comprising a leader actuating member;

a follower actuator comprising a follower actuating member;

a differential controller; and a valve for controlling a flow of hydraulic fluid to the follower actuator;

wherein the leader actuator is connected to the differential controller such that the differential controller is displaced by a distance representative of a movement of the leader actuating member;

wherein the follower actuator is connected to the differential controller such that the differential controller is displaced by a distance representative of the movement of the follower actuating member;

wherein a resultant displacement of the differential controller is representative of a difference between the movement of the leader actuating member and the movement of the follower actuating member;

wherein the valve is in fluid communication with the follower actuator such that the flow of hydraulic fluid through the valve adjusts the movement of the follower actuating member; and wherein the differential controller is connected to the valve such that the resultant displacement of the differential controller controls the flow of hydraulic fluid through the valve such that the movement of the follower actuating member is adjusted based on the movement of the leader actuating member, wherein the connection between the leader actuator and the differential controller or the connection between the follower actuator and the differential controller comprises a shaft, wherein the shaft is arranged to carry no load.

2. The system as claimed in claim 1, wherein the system comprises a mechanical connection between the leader actuator and the differential controller and wherein the mechanical connection is arranged to transmit the movement of the leader actuating member to the differential controller.

3. The system as claimed in claim 2, wherein the system comprises a mechanical connection between the follower actuator and the differential controller and wherein the mechanical connection is arranged to transmit the movement of the follower actuating member to the differential controller.

4. The system as claimed in claim 1, wherein the differential controller comprises two opposite threaded screws.

5. The system as claimed in claim 4, wherein the mechanical connection between the leader actuator and the differential controller is arranged to wind or unwind one of the two opposite threaded screws of the differential controller in response to the movement of the leader actuating member.

6. The system as claimed in claim 4, wherein the mechanical connection between the follower actuator and the differential controller is arranged to wind or unwind one of the two opposite threaded screws of the differential controller in response to the movement of the follower actuating member.

7. The system as claimed in claim 4, wherein the first opposite threaded screw of the two opposite threaded screws is wound at a first rate and the second opposite threaded screw of the two opposite threaded screws is wound at a second rate; and wherein the two opposite threaded screws are arranged to displace the differential controller when the first rate is different to the second rate by the resultant displacement of the differential controller.

8. The system as claimed in claim 1, wherein the leader actuator comprises a leader motion conversion device;

wherein the leader motion conversion device is arranged to convert the movement of the leader actuating member into an input for the differential controller; and optionally wherein the leader motion conversion device comprises a gearbox and one of a rollerscrew, a ballscrew or an acme screw.

9. The system as claimed in claim 1, wherein the follower actuator comprises a follower motion conversion device;

wherein the follower motion conversion device is arranged to convert the movement of the follower actuating member into an input for the differential controller.

10. The system as claimed in claim 9, wherein the follower motion conversion device comprises a gearbox and one of a rollerscrew, a ballscrew or an acme screw.

11. The system as claimed in claim 1, wherein the shaft comprises a flexible shaft.

12. The system as claimed in claim 1, wherein the valve comprises a valve spool and the differential controller is arranged to displace the valve spool by a distance representative of the resultant displacement of the differential controller to control the flow of hydraulic fluid through the valve.

13. The system as claimed in claim 1, wherein the system comprises a hydraulic fluid supply in fluid communication with the valve.

14. The system as claimed in claim 1, wherein the system comprises:

a plurality of follower actuators each comprising a follower actuating member;

a plurality of differential controllers; and a plurality of valves;

wherein each of the plurality of valves is in fluid communication with a corresponding follower actuator of the plurality of follower actuators;

wherein the leader actuator is connected to each of the plurality of differential controllers such that each of the differential controllers is displaced by a distance representative of a movement of the leader actuating member;

wherein each of the plurality of follower actuators is connected to a corresponding differential controller of the plurality of differential controllers such that the corresponding differential controller is displaced by a distance representative of a movement of the follower actuating member;

wherein a resultant displacement of each of the plurality of differential controllers is representative of a difference between the movement of the leader actuating member and the movement of the corresponding follower actuating member;

wherein each of the plurality of valves controls a flow of hydraulic fluid to their corresponding follower actuator such that the flow of hydraulic fluid through the valve adjusts the movement of a corresponding follower actuating member; and wherein each of the plurality of differential controllers is connected to a corresponding valve of the plurality of valves such that the resultant displacement of the differential controller controls the flow of hydraulic fluid through the corresponding valve such that the movement of the corresponding follower actuating member is adjusted based on the movement of the leader actuating member.

15. A method of synchronising a leader actuator and a follower actuator;

wherein the leader actuator comprises a leader actuating member and the follower actuator comprises a follower actuating member;

the method comprising:

moving the leader actuating member;

displacing a differential controller by a distance representative of the movement of the leader actuating member;

displacing the differential controller by a distance representative of a movement of the follower actuating member;

wherein a resultant displacement of the differential controller is representative of a difference between the movement of the leader actuating member and the movement of the follower actuating member;

wherein a valve is in fluid communication with the follower actuator such that a flow of hydraulic fluid through the valve adjusts the movement of the follower actuating member, using the resultant displacement of the differential controller to control the flow of hydraulic fluid through the valve such that the movement of the follower actuating member is adjusted based on the movement of the leader actuating member;

wherein the connection between the leader actuator and the differential controller or the connection between the follower actuator and the differential controller comprises a shaft, wherein the shaft is arranged to carry no load.

16. A hydraulic actuator synchronization system comprising:

a leader actuator comprising a leader actuating member;

a follower actuator comprising a follower actuating member;

a differential controller; and a valve for controlling a flow of hydraulic fluid to the follower actuator;

wherein the leader actuator is connected to the differential controller such that the differential controller is displaced by a distance representative of a movement of the leader actuating member;

wherein the follower actuator is connected to the differential controller such that the differential controller is displaced by a distance representative of the movement of the follower actuating member;

wherein a resultant displacement of the differential controller is representative of a difference between the movement of the leader actuating member and the movement of the follower actuating member;

wherein the valve is in fluid communication with the follower actuator such that the flow of hydraulic fluid through the valve adjusts the movement of the follower actuating member; and wherein the differential controller is connected to the valve such that the resultant displacement of the differential controller controls the flow of hydraulic fluid through the valve such that the movement of the follower actuating member is adjusted based on the movement of the leader actuating member;

wherein the differential controller comprises two opposite threaded screws;

wherein the first opposite threaded screw of the two opposite threaded screws is wound at a first rate and the second opposite threaded screw of the two opposite threaded screws is wound at a second rate; and wherein the two opposite threaded screws are arranged to displace the differential controller when the first rate is different to the second rate by the resultant displacement of the differential controller.

17. A hydraulic actuator synchronization system comprising:

a leader actuator comprising a leader actuating member;

a follower actuator comprising a follower actuating member;

a differential controller; and a valve in fluid communication with the follower actuator;

a hydraulic fluid supply in fluid communication with the valve which is configured to control a flow of hydraulic fluid to the follower actuator such that the flow of hydraulic fluid through the valve adjusts the movement of the follower actuating member, wherein the follower actuator is in fluid communication with the hydraulic fluid supply exclusively through the valve;

a first and a second flow lines connecting the valve with the follower actuator, the first flow line supplying a first region of the follower actuating member whereas the second flow line supplying a second region of the follower actuating member;

wherein the leader actuator is connected to the differential controller such that the differential controller is displaced by a distance representative of a movement of the leader actuating member;

wherein the follower actuator is connected to the differential controller such that the differential controller is displaced by a distance representative of the movement of the follower actuating member;

wherein a resultant displacement of the differential controller is representative of a difference between the movement of the leader actuating member and the movement of the follower actuating member;

wherein the differential controller is connected to the valve such that the resultant displacement of the differential controller controls the flow of hydraulic fluid through the valve such that the movement of the follower actuating member is adjusted based on the movement of the leader actuating member.

18. The system as claimed in claim 17, wherein the valve comprises a valve spool and the differential controller is arranged to displace the valve spool by a distance representative of the resultant displacement of the differential controller to control the flow of hydraulic fluid through the valve.

19. The system as claimed in claim 17, wherein the system comprises a hydraulic fluid supply which supplies fluid to a shutoff valve, wherein the shutoff valve is connected to a direct drive valve which controls the pressure of the hydraulic fluid flowing to the leader actuator;

wherein the direct drive valve adjusts the pressure of the hydraulic fluid flowing through flow a first and a second flow lines which supply a first region of the leader actuating member and a second region of the leader actuating member, respectively.

* * * * *